United States Patent
Takahashi et al.

(10) Patent No.: US 6,463,280 B1
(45) Date of Patent: Oct. 8, 2002

(54) TABLE BASED SCHEDULING ALGORITHM FOR DOWNLINK BANDWIDTH ALLOCATION

(75) Inventors: Scott M. Takahashi, Torrance, CA (US); Roland Y. Wong, Monrovia, CA (US); Lisa A. Moy-Yee, Torrance, CA (US); Gefferie H. Yee-Madera, San Gabriel, CA (US); Darren R. Gregoire, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/575,888

(22) Filed: May 22, 2000

(51) Int. Cl.$^7$ ................................................ H04B 7/185
(52) U.S. Cl. ..................... 455/428; 455/452; 455/454
(58) Field of Search ............................. 455/452, 454, 455/428, 429, 427, 430, 450, 445, 446, 62

(56) References Cited

U.S. PATENT DOCUMENTS 5,862,486 A * 1/1999 Przelomiec ................. 455/454
6,009,332 A * 12/1999 Haartsen ..................... 455/444
6,301,233 B1 * 10/2001 Ku et al. ..................... 455/450
6,366,761 B1 * 4/2002 Montpetit ................... 455/428

* cited by examiner

Primary Examiner—Thanh Congle
Assistant Examiner—Tan Trinh
(74) Attorney, Agent, or Firm—McAndrews, Held & Malloy, Ltd.

(57) ABSTRACT

The method allocates (302) subclass entries in an ordered list (200) (which may be organized as a table, for example). Each entry (210–214) generally corresponds to one of several predetermined cell subclasses, and the allocation reserves a total number of each subclass entry in the ordered list according to a predetermined amount of bandwidth desired for each cell subclass. The subclasses may be associated with factors such as coding rate, downlink beam area, virtual paths or virtual circuits, quality of service parameters, and the like. The method then examines (304) each subclass entry in the ordered list and selects (306) a cell from a cell memory (which may be a queue) that matches the subclass entry. The matched cell is then transmitted (308). The method may also allocate sets of subclass entries in groups corresponding to a frame size and dynamically update (310) the ordered list during operation of the cell switch.

17 Claims, 2 Drawing Sheets

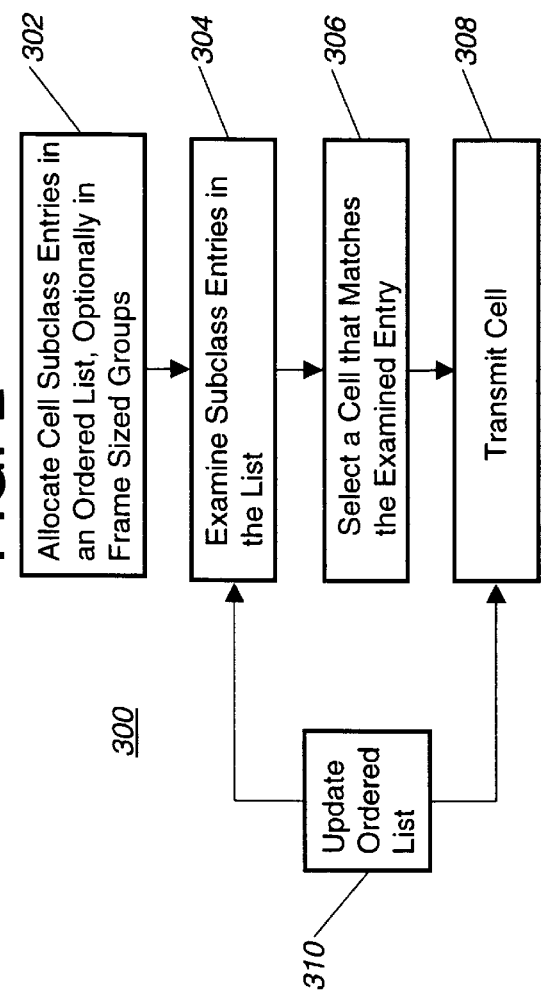

TABLE BASED SCHEDULING ALGORITHM FOR DOWNLINK BANDWIDTH ALLOCATION

CROSS REFERENCE TO RELATED APPLICATION

This application is related to co-pending U.S. patent application Ser. No. 09/575,889, filed concurrently herewith, entitled: "Modifying Parameters for Processing Data Cells in a Communication Satellite Under Terrestrial Control".

BACKGROUND OF THE INVENTION

The present invention relates to satellite communication systems. In particular, the present invention relates to bandwidth allocation in a downlink of a satellite communication system.

Today, relatively simple communications satellites provide information distribution on a global scale. While presently available communications satellites are effective, they generally have relatively little data processing capability or intelligence. However, technology and cost considerations have brought the communications industry to the point where future communication satellites will intelligently switch, process, and retransmit individual data cells. In such a satellites, a cell switch is the component of primary importance.

Unlike a cell switch for a terrestrial network (which simply routes cells between ports to users who are all considered to have equal ability to decode or read the cells), a space based cell switch has several unique requirements. An output port for a space based cell switch generally corresponds to a specific downlink beam supporting multiple terminals. Different terminals may experience different signal strengths due to weather, position in the beam, signal interference, or other factors. Thus, the signals transmitted to some terminals may require compensation such as additional error coding to ensure that the terminal receives the signal reliably. Over-coding where it is not necessary, however, wastes bandwidth and decreases the information throughput of the satellite (and therefore decreases its revenue potential).

Furthermore, terminal density is generally not uniform within the downlink beam. Thus, it may be more efficient to hop the downlink beam to different geographic locations to provide communications bandwidth for a large geographic area. In such a case, the cell switch would need to intelligently route cells to the downlink beam when the downlink beam was pointing at the geographic area for which the cell is destined. In addition, a mechanism for allocating bandwidth among the many terminals receiving data in the downlink beam is, of course, generally desirable.

As noted above, however, past terrestrial cell switches treated all receivers alike. In other words, the technology present in past terrestrial cell switches was inappropriate for a sophisticated cell switching satellite, in part due to the unique considerations of the space based environment explained above.

There is a need for an effective and flexible mechanism for cell switching and downlink bandwidth allocation in a satellite communication system.

BRIEF SUMMARY OF THE INVENTION

It is an object of the present invention to provide a mechanism for downlink bandwidth allocation in a cell switching satellite.

Another object of the present invention is to allocate bandwidth in a downlink using a table based technique.

Yet another object of the present invention is to provide a mechanism for scheduling downlink transmission of data cells according to predetermined cell subclasses.

One or more of the foregoing objects is met in whole or in part by a method for allocating bandwidth in a satellite downlink. The method allocates subclass entries in an ordered list (which may be organized as a table, for example). Each entry generally corresponds to one of several predetermined cell subclasses, and the allocation reserves a total number of each subclass entry in the ordered list according to a predetermined amount of bandwidth desired for each cell subclass.

Thus, for example, all, some, or none of the bandwidth available in the downlink may be reserved for a first subclass of cells, while the remaining bandwidth may then be used for a second subclass of cells. The subclasses may be associated with factors such as coding rate, downlink beam area, virtual paths or virtual circuits, quality of service parameters, and the like. The method then examines each subclass entry in the ordered list and selects a cell from a cell memory (which may be a queue) that matches the subclass entry. The matched cell is then transmitted.

The method may also allocate sets of subclass entries in groups corresponding to a frame size. For example, downlink bandwidth for a downlink comprised of 16 slot (or any other size) frames may be provided by selecting sets of 16 subclass entries mutually compatible for transmission in a single frame. As one example, each of the 16 entries may share a common coding rate and quality of service.

The present invention also provides a downlink bandwidth controller for allocating bandwidth in a downlink. The downlink bandwidth controller includes a list memory storing an ordered list of subclass entries. Each subclass entry generally corresponds to one of several predetermined cell subclasses. In addition, the ordered list includes a sum of subclass entries which indicates the predetermined amount of bandwidth desired for each cell subclass. Also included is cell selection circuitry coupled to the list memory for extracting a cell from a cell memory that matches a subclass entry under examination in the ordered list. A transmitter is provided to transmit each extracted cell.

In the downlink bandwidth controller, the list memory may be stored as a table and the cell memory may be stored as a queue, for example. In one embodiment, the cell memory and the list memory are common portions of a main memory, although the cell and list memories may be implemented separately. As noted above, the subclass entries may represent coding rates, downlink beam areas, quality of service parameters, and the like.

BRIEF DESCRIPTION OF THE DRAWINGS

FIG. 2 shows one example of a scheduling table.

FIG. 3 illustrates a flow diagram of downlink bandwidth allocation and cell transmission.

DETAILED DESCRIPTION OF THE INVENTION

Figure 1:
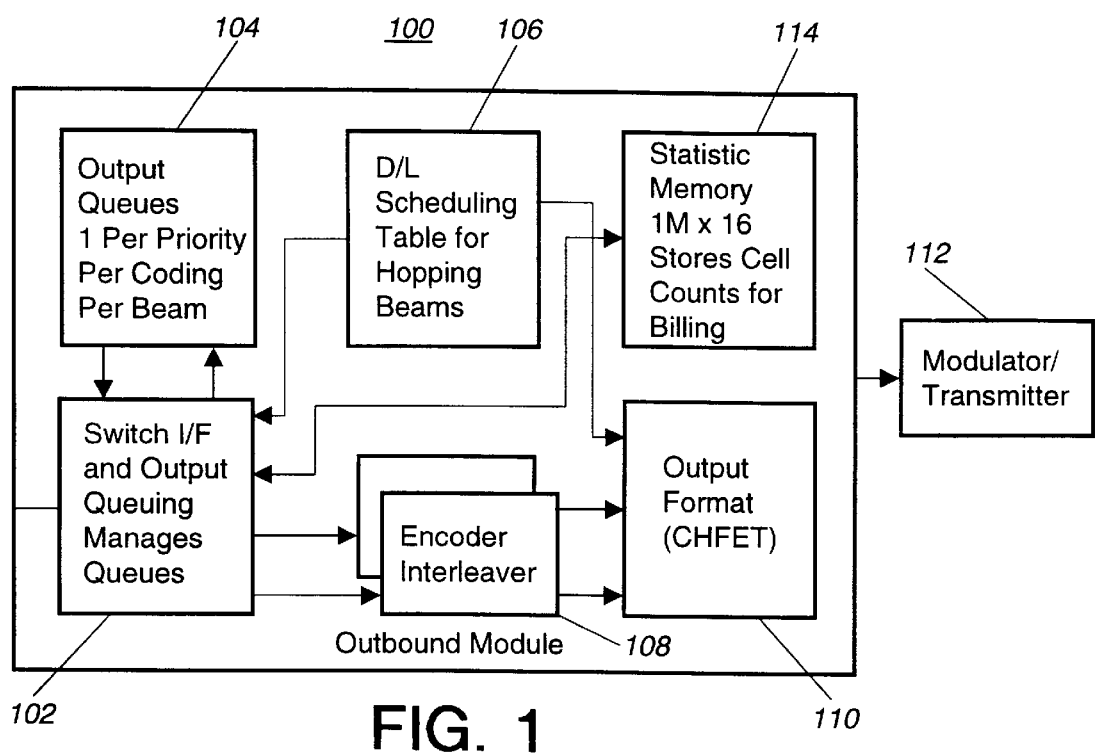
FIG. 1 illustrates an outbound module of a cell switching satellite.

Turning now to FIG. 1, that figure shows an outbound module 100 of a communication satellite. In addition to its other functions, the outbound module, as explained below, operates as a downlink bandwidth controller. Although only one outbound module is shown, a cell switching satellite may in fact include many such outbound modules.

The outbound module 100 includes a switch interface/fetch and output queuing processor 102 which may, for example, receive Asynchronous Transfer Mode (ATM) cells from a switch matrix. The processor 102 may then place the cells in an output queue cell memory 104 according to any desired priority algorithm. As explained in more detail below, the processor 102 (which functions as cell selection circuitry) reads ATM cells from the queue memory 104 according to parameters stored in a scheduling table 106 (generally, an ordered list memory) and transmits the ATM cells to an encoder and interleaver 108. An output format processor 110 prepares the ATM cells for transmission to the transmitter 112. A statistical memory 114 may also be included to store cell counts for billing purposes.

The parameters by which ATM cells are queued, routed, and selected for transmission are generally integrated into the scheduling table 106. The scheduling table 106 may be modified dynamically by a ground based call admission and control function executed by a Network Operations and Control Center (NOC), or by the satellite itself during operation. In general, the scheduling table 106 stores cell subclass entries in an ordered list (for example, a table) of any desired size.

The subclass entries group cells by any desired criteria, including, but not limited to, guaranteed bandwidth, coding rate, beam area information (such as the physical destination port or downlink beam), bandwidth allocation to each priority (Quality Of Service class), terminal service level, control of QOS parameters associated with each priority, allocation of bandwidth to coding rates (or other adaptive downlink solutions) and the beam areas for hopping beams, individually or in combination.

As one example, a subclass A, subclass B, and subclass C of cells may be defined. The subclass A may then correspond to heavy error coding, highest priority of service, in beam area 1, subclass B may correspond to heavy error coding, second priority of service, in beam area 1, and subclass C may correspond generally to beam area 2. Any additional number of subclasses using any additional criteria may be defined, however. For example, assuming 16 beam areas, 2 coding rates, and 4 QOSs, 128 subclasses may be defined to support each combination of beam area, subclass, and QOS.

Turning to FIG. 2, one example of a downlink scheduling table 200 using the subclasses A, B, and C is shown. The downlink table, as shown, includes 64 entries, grouped into 4 sets 202, 204, 206, 208 of 16 entries (for example, the subclass A entry 210, the subclass B entry 212, and the subclass C entry 214). In one embodiment (and as shown in FIG. 2), the entries are grouped by any desired frame size, such that all the cells transmitted during a single frame are compatible with every other cell transmitted in the frame (for example, in terms of modulation and coding). In FIG. 2, the frames are assumed to include 16 timeslots.

In operation, the processor 102 examines the cell subclass entries in the scheduling table 200. The processor 102 matches the cell subclass entry with a cell stored in the cell memory 104, and extracts the cell for transmission. The processor 102, may for example, proceed sequentially and cyclically through the scheduling table 200. Note that the number of entries in the scheduling table 200 determines the granularity with which downlink bandwidth may be allocated, and the number of entries of each subclass type determines the total bandwidth allocated to each subclass. For example, in FIG. 2, subclass A has been allocated 32/64=50% of the available bandwidth, subclass B has been allocated 16/64=25% of the available bandwidth, and subclass C has been allocated 16/64=25% of the available bandwidth. The granularity is 1/64=1.5625%.

The relative positions of the subclass entries in the table, and the procedure by which the processor 102 scans thought the scheduling table 200, determines when each type of cell may be transmitted. For example, assuming that the processor 102 scans sequentially through the scheduling table 200, an entire frame of subclass A cells is transmitted, followed by a frame alternating between two subclass A and two subclass B cells. An entire frame of type C cells is then transmitted, followed by a frame of eight subclass B cells and eight subclass A cells. Transmission may then cycle, repeating from the entire frame of subclass A cells.

Turning now to FIG. 3, that figure shows a flow diagram 300 of one embodiment of downlink bandwidth allocation and cell transmission according to the present invention. Initially, at step 302, the cell switch (or NOC) allocates cell subclass entries in an ordered list. As noted above, the allocation may by done according to frame size. At step 304, the cell switch examines the cell subclass entries, and at step 306 extracts a matched cell from a cell memory. The cell is then transmitted at step 308. At step 310, the cell switch, if desired, may update the ordered list to dynamically allocate bandwidth among the cell subclasses by altering the entries in the ordered list.

Those skilled in the art will recognize that the preferred form of the invention may be altered or modified without departing from the true spirit and scope of the invention as defined in the accompanying claims. For example, the present invention can operate not only on ATM cells, but other forms of packet switching cells. The hardware elements illustrated may be implemented, for example, with discrete circuitry, in a single custom ASIC, or with a general purpose CPU/software combination. While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for allocating bandwidth in a downlink beam from a communication satellite, the method comprising:
   allocating subclass entries in an ordered list corresponding to one of a plurality of predetermined cell subclasses, the allocating step allocating a total number of each subclass entry according to a predetermined amount of bandwidth desired for each cell subclass;
   examining each subclass entry in the ordered list and selecting a cell from memory that matches the subclass entry; and
   transmitting the cell.

2. The method of claim 1, wherein the allocating step further comprises allocating sets of compatible subclass entries in frame sized groups.

3. The method of claim 1, wherein the allocating step further comprises allocating subclass entries in an ordered list arranged as a table.

4. The method of claim 3, wherein the allocating step further comprises allocating sets of subclass entries in frame sized groups.

5. The method of claim 1, wherein the step of selecting a cell from memory comprises selecting a cell from a queue.

6. The method of claim 1, further comprising the step of dynamically updating the ordered list.

7. The method of claim 1, wherein the step of examining comprises examining each subclass entry in the ordered list sequentially from the beginning of the ordered list to the end of the ordered list.

8. A downlink bandwidth controller for allocating bandwidth in a downlink from a communication satellite, the downlink bandwidth controller comprising:

a list memory storing an ordered list of cell subclass entries, each cell subclass entry corresponding to one of a plurality of predetermined cell subclasses, the ordered list including a total number of cell subclass entries indicative of a predetermined amount of bandwidth desired for each cell subclass; and cell selection circuitry coupled to the list memory for extracting a cell from a cell memory that matches a cell subclass entry under examination in the ordered list.

9. The downlink bandwidth controller of claim 8, further comprising a transmitter coupled to the cell selection circuitry for transmitting extracted cells.

10. The downlink bandwidth controller of claim 8, wherein the ordered list is a table.

11. The downlink bandwidth controller of claim 8, wherein the cell memory is a queue.

12. The downlink bandwidth controller of claim 8, wherein the cell memory and the list memory are portions of a common main memory.

13. The downlink bandwidth controller of claim 8, wherein the list memory comprises at least one set of compatible subclass entries organized for a predetermined frame size.

14. The downlink bandwidth controller of claim 13, wherein the set of subclass entries corresponds to a single predetermined coding rate and a single predetermined downlink beam area.

15. The downlink bandwidth controller of claim 14, wherein each entry in the set of subclass entries is associated with a predetermined quality of service parameter.

16. The downlink bandwidth controller of claim 8, wherein at least one of the subclass entries represents a predetermined coding rate and a predetermined downlink beam area.

17. The downlink bandwidth controller of claim 16, wherein the subclass entry further represents a predetermined quality of service parameter.

* * * * *